Figure 1:
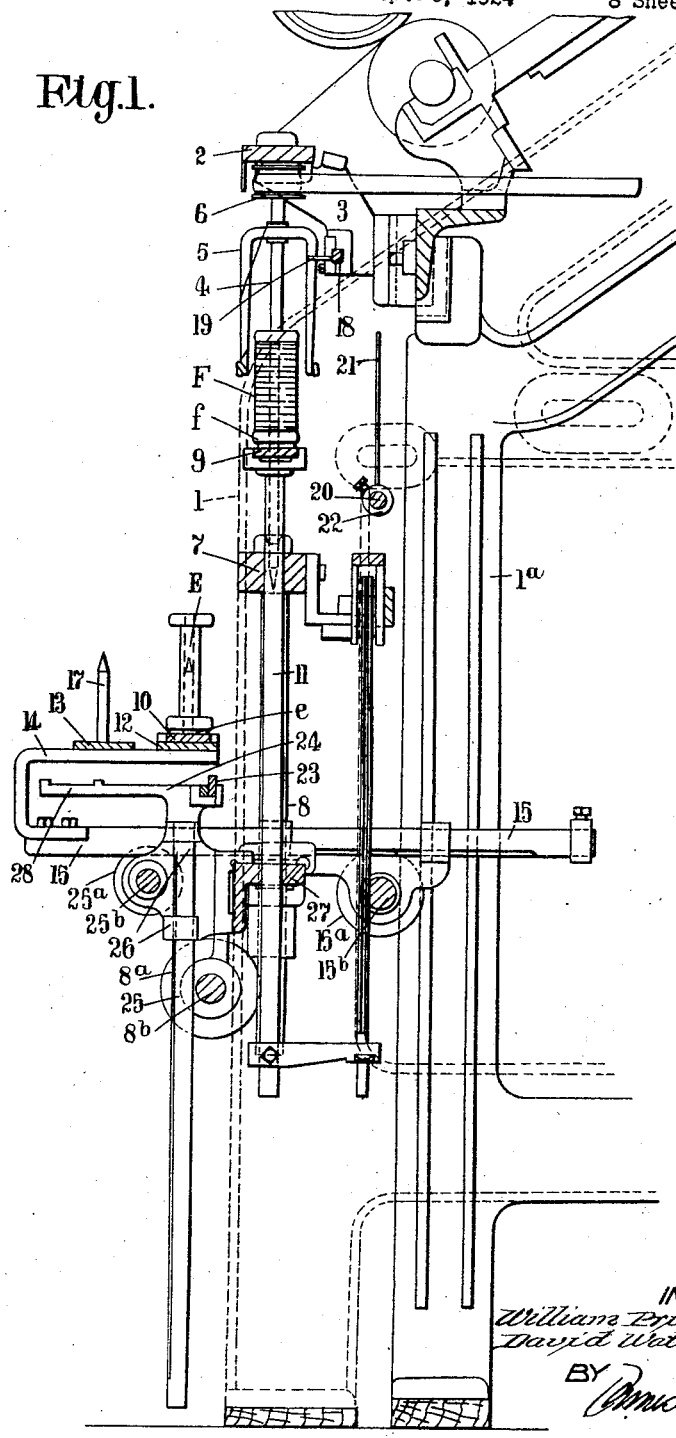

June 23, 1925.  1,543,618

W. PRINCE-SMITH ET AL

SPINNING, TWISTING, AND ANALOGOUS MACHINE

Filed Sept. 3, 1924   8 Sheets-Sheet 1

INVENTORS
William Prince-Smith
David Waterhouse
BY
ATTORNEY

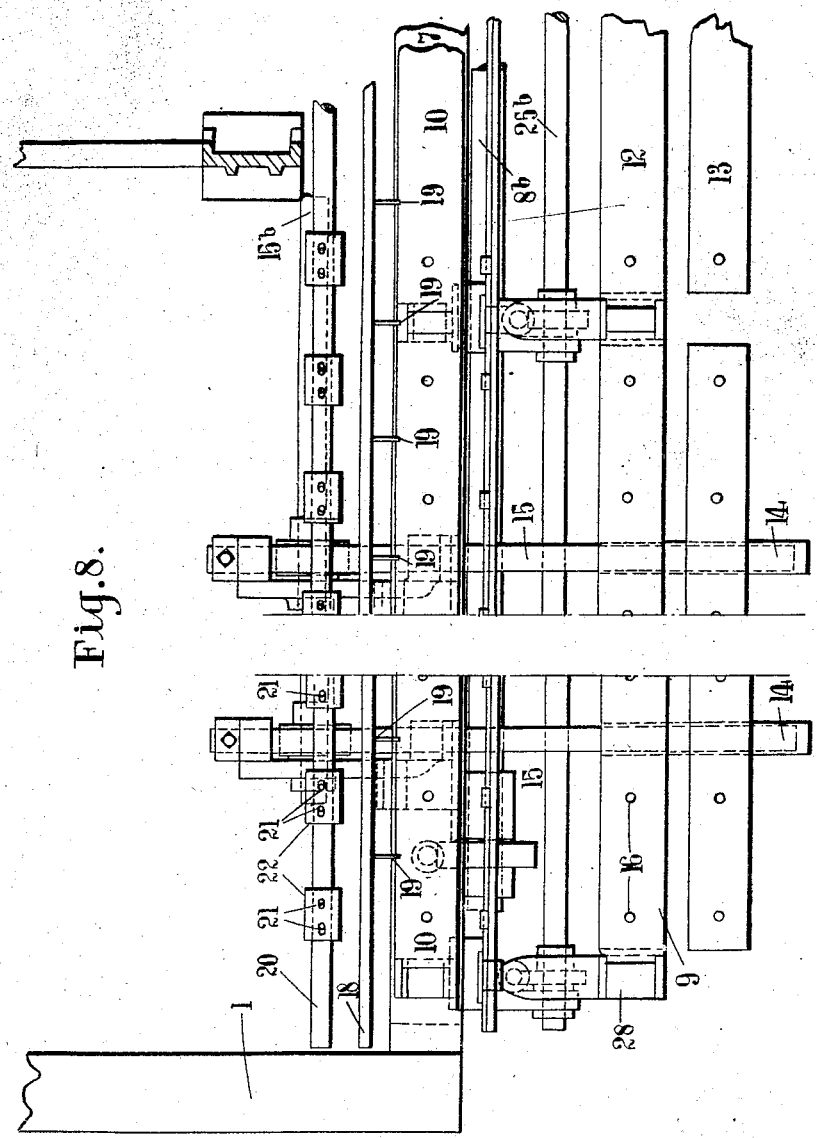

Patented June 23, 1925.

1,543,618

UNITED STATES PATENT OFFICE.

WILLIAM PRINCE-SMITH AND DAVID WATERHOUSE, OF KEIGHLEY, ENGLAND.

SPINNING, TWISTING, AND ANALOGOUS MACHINE.

Application filed September 3, 1924. Serial No. 735,637.

*To all whom it may concern:*

Be it known that we, WILLIAM PRINCE-SMITH and DAVID WATERHOUSE, both subjects of the King of Great Britain, residing at Keighley, in the county of Yorkshire, England, have invented certain new and useful Improvements in Spinning, Twisting, and Analogous Machines, of which the following is a specification.

This invention relates to spinning, twisting and analogous machines having "live" spindles and employing mechanical doffing mechanism in which the transfer of the bobbins is effected by manipulating duplicate lifter-rails by means of appropriate devices. It also relates to machines of the kind in which the spindles are supported and driven at their upper ends, their lower ends receiving lateral and if necessary vertical support from bearings carried by a vertically movable rail.

The invention has for its principal object to enable the doffing operation to be performed in a more simple manner and in fewer movements than heretofore; other objects being to obviate inconvenience and loss of time due to the drag washers becoming displaced as occurs frequently with machines employing a single lifter-rail, and also to enable any drag washers which require renewal to be replaced with facility while the machine is in operation and without stopping or interfering with any functioning part for that purpose.

Accordingly the invention comprises a spinning, twisting or analogous machine having live spindles on to and from which the bobbins are transferred, by the manipulation of two separate apertured lifter-rails alternately, from and on to bobbin pegs capable of being aligned co-axially with the spindles; the bobbins resting on their respective drag washers throughout their transference.

Suitable means are provided for displacing and positioning the various movable parts or members, and appropriate devices are included on the machine for the purpose of severing the yarns or threads after the full bobbins have been doffed on to their respective bobbin pegs.

A flyer-spinning frame, by way of example, may be constructed according to the present invention in the following manner:—

Live spindles supported by an overhead rail are driven by whorls carried above the flyers which rotate as one with said spindles, and the lower ends of said spindles are received for lateral support in appropriate bearings borne by a continuous rail adapted to be displaced vertically during doffing by rack pillars and pinions, or otherwise suitably.

Two separate lifter-rails are provided, exchangeable with each other and each in turn functioning periodically to traverse in the usual manner the bobbins receiving the yarn or thread during the spinning operation; each of these lifter-rails being formed with a series of apertures corresponding to the number and positions of the spindles which can pass freely therethrough.

The usual pokers operated by known or appropriate mechanism serve to travel that lifter-rail for the time being positioning bobbins for the spinning operation.

Two transfer rails are also provided, each of which carries a series of short upstanding bobbin pegs of a diameter and position corresponding with the diameters of the spindles, these transfer rails being furnished with appropriate mechanism for manipulating the respective series of bobbin pegs into axial alignment with the spindles in order to receive therefrom or to place thereon full or empty bobbins as the case may be.

Each of said transfer rails co-acts with one of the aforesaid lifter-rails when the exchange of bobbins is required to take place.

Appropriate thread severing means are provided, as well as other accessories usual in machines of this kind.

Figure 2:
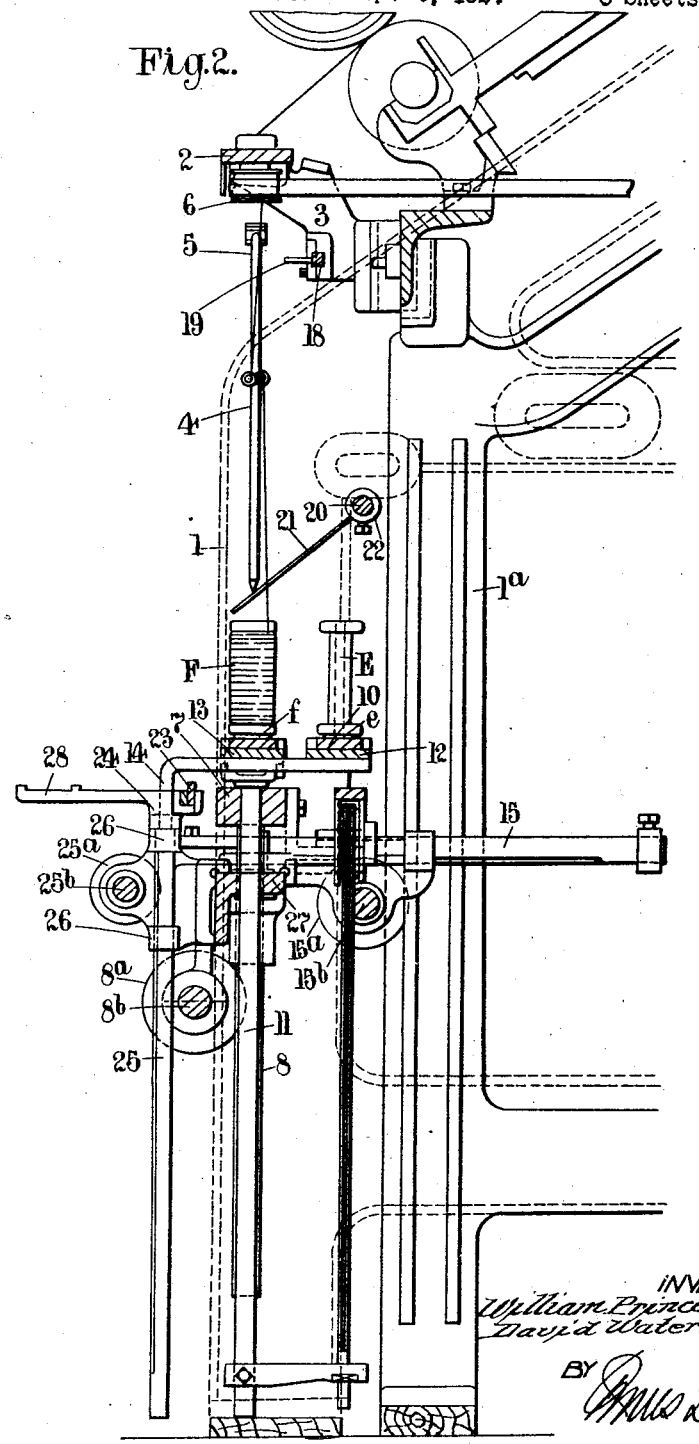
Figure 3:
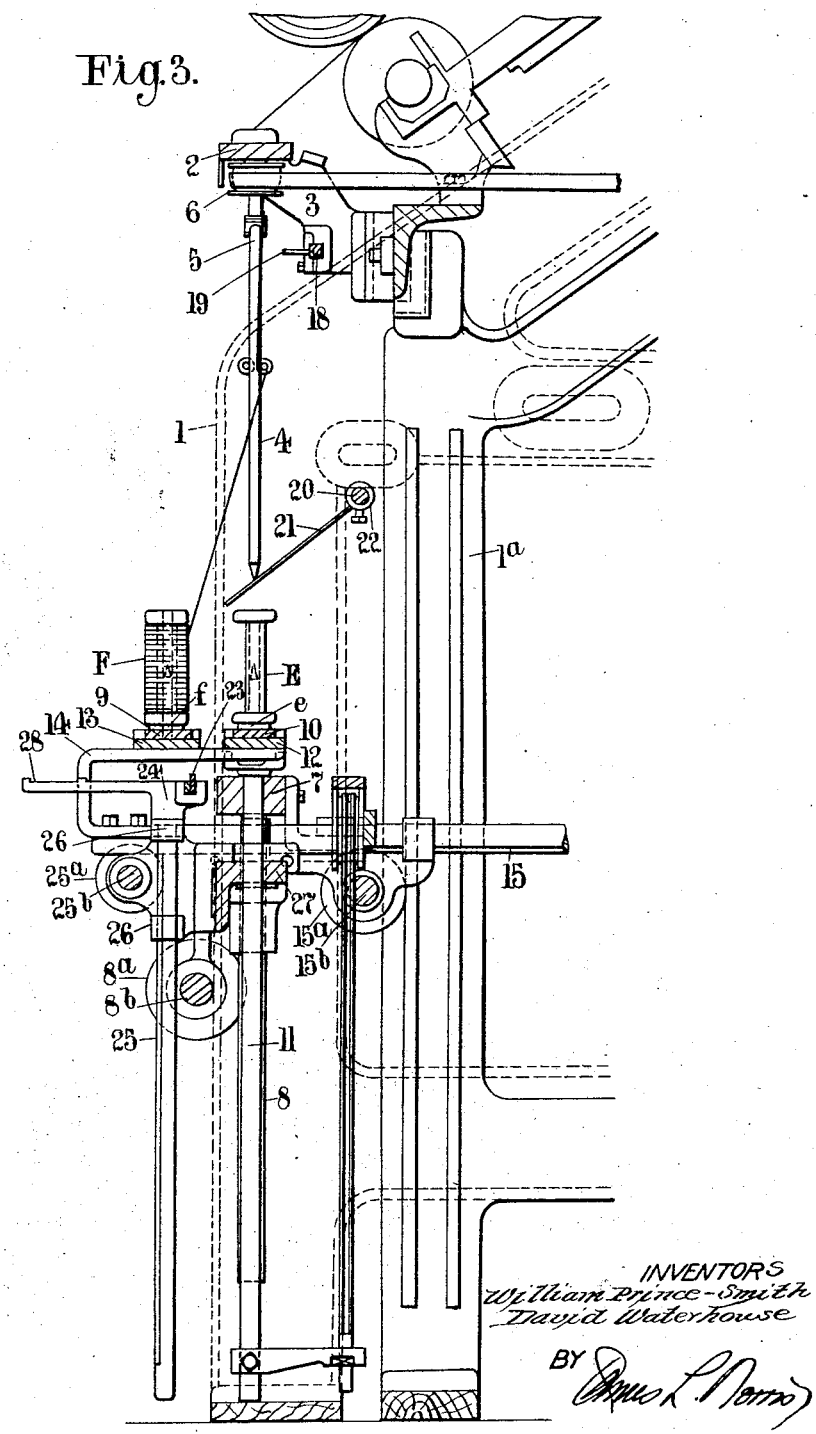
Figure 4:
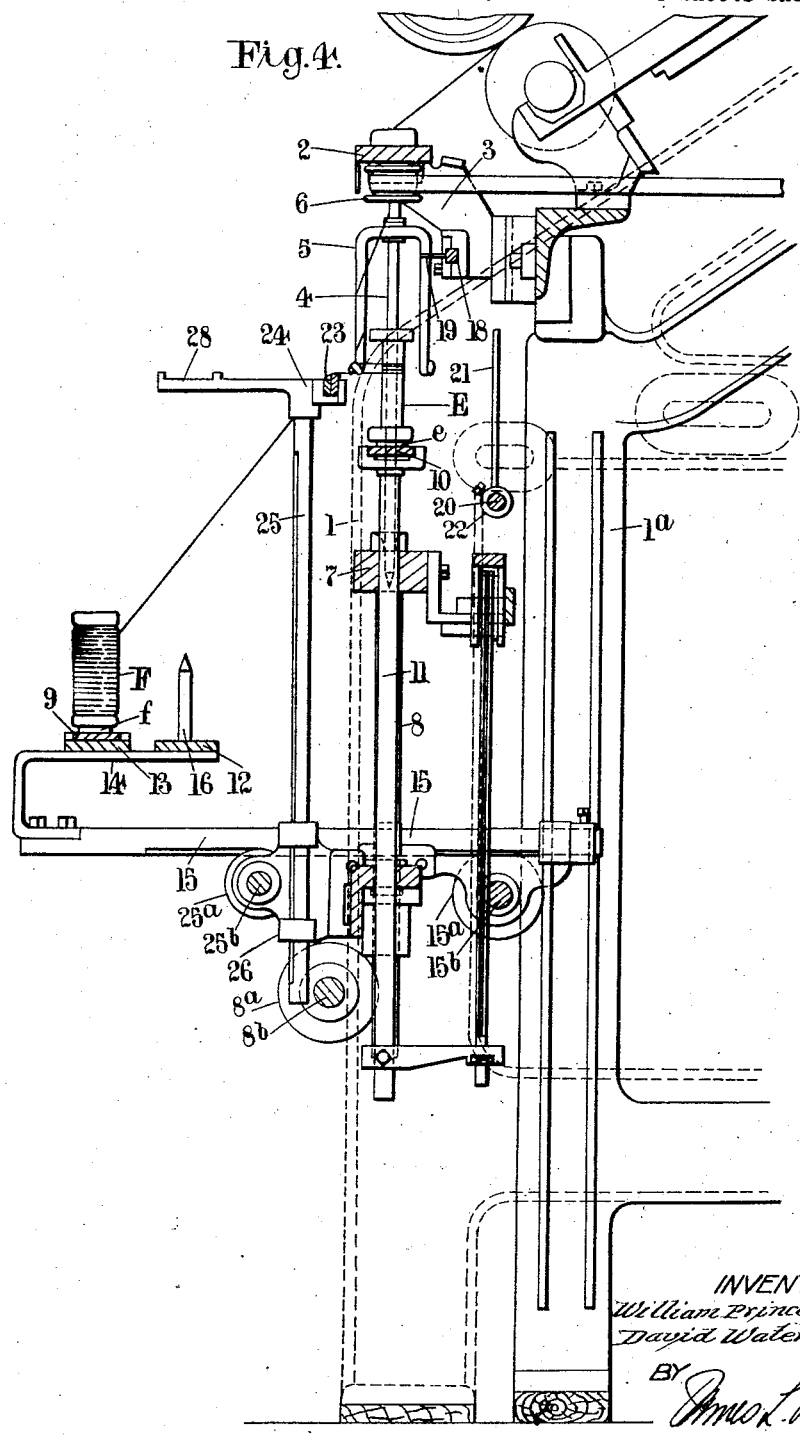
Figure 5:
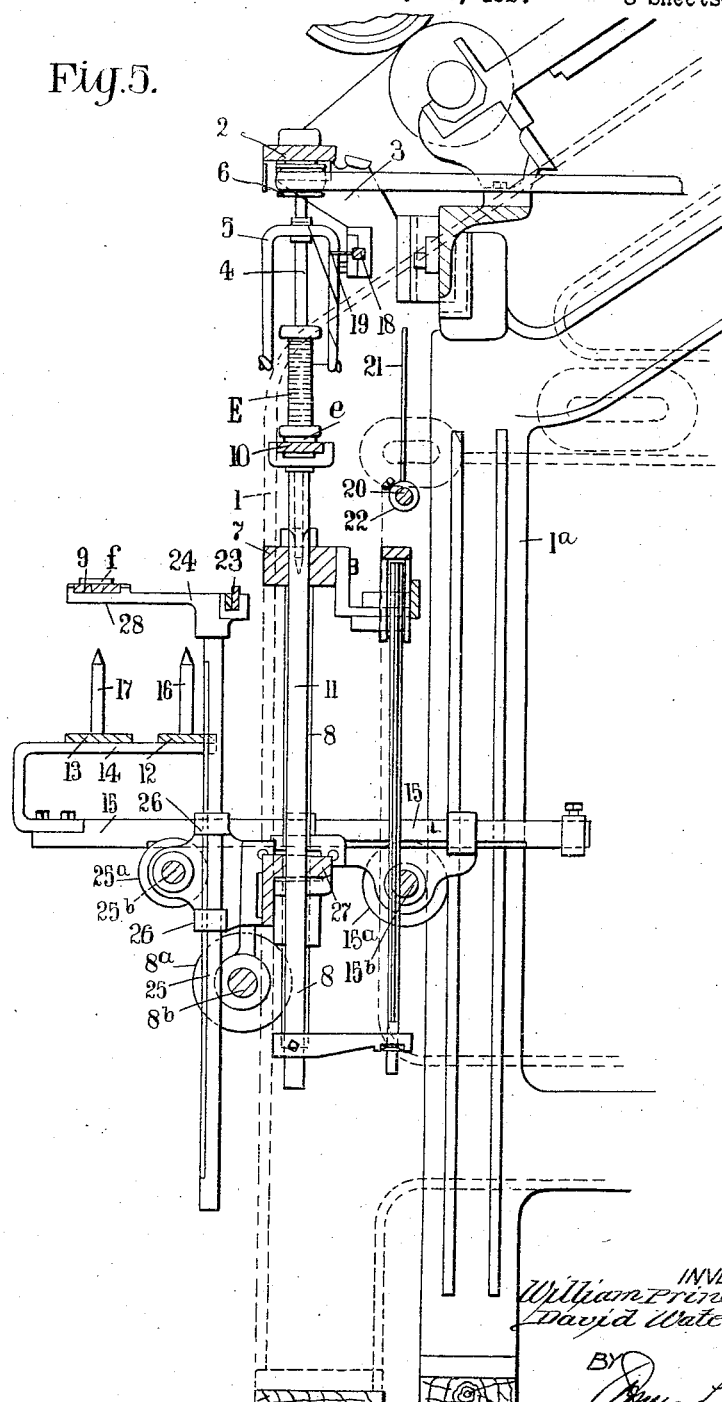
Figure 6:
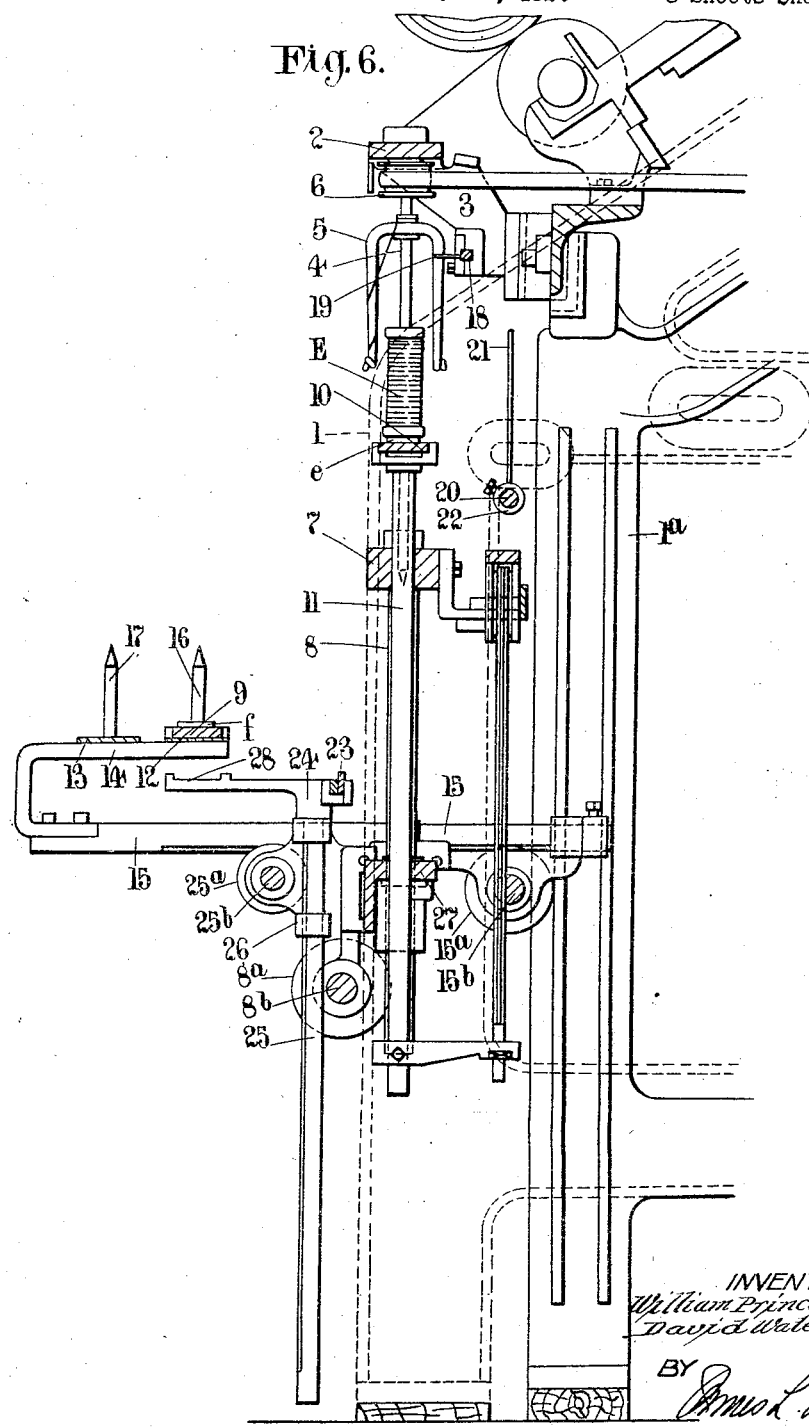

In the accompanying drawings, which illustrate one practical example, Figures 1 to 6 inclusive show a vertical sectional elevation of one side of a flyer spinning frame; in Figure 1 the parts being in the spinning position, while in Figures 2, 3, and 4, the successive positions occupied by the parts during the doffing operation are indicated. In Figures 5 and 6 two positions taken up subsequently to the doffing operation are illustrated.

Figure 7:
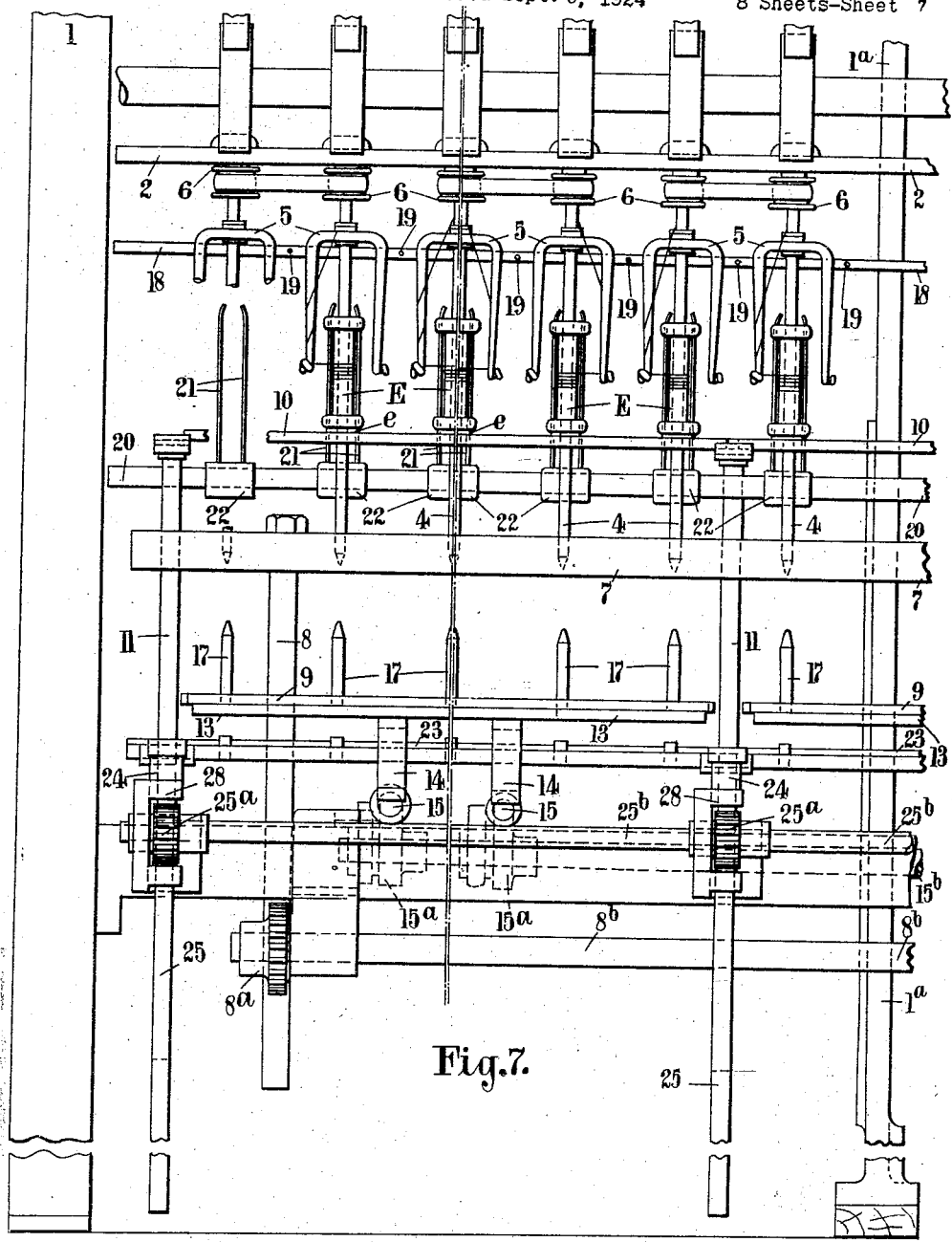

Figure 7 is a front elevation of the left hand end of the machine, and Figure 8 is a sectional plan view thereof.

1 is the end stand of the main frame of the machine, 1ª is an intermediate frame member, and 2 is a rail secured longitudinally of the machine upon brackets 3, which rail supports in known manner a series of depending live spindles 4 carrying flyers 5 and driving whorls 6.

7 is a vertically movable rail disposed longitudinally of the frame and having bushed apertures or carrying bearings to receive and afford lateral support to the lower ends of the spindles 4 as is usual in this type of machine. This rail 7 is carried by a number of vertically movable rack pillars 8 operated by pinions $8^a$ mounted upon a horizontal shaft $8^b$.

9 and 10 are the two lifter-rails, the rail 9 being shown carried at the heads of the usual pokers 11 and the rail 10 being located for the time being upon a transfer peg or pin-rail 12 which together with another similar transfer peg or pin-rail 13 parallel to it is supported by cranked brackets 14 carried in front of the spindles by horizontally movable rack rods 15 operated by pinions $15^a$ mounted upon a shaft $15^b$.

F are the full bobbins, E are the empty bobbins, and $f$ and $e$ are their respective drag washers.

The transfer rails 12 and 13 are each provided with a series of upstanding short pegs or pins 16 and 17, respectively, which correspond in number, diameter and position with the spindles 4; and the lifter-rails 9 and 10 are each fashioned with a series of apertures spaced correspondingly with the spacing of the pins 16 and 17 and of a size to permit the lifter-rails to pass freely over the spinning spindles 4 or on to the pins 16 and 17 as the case may be.

The rails 9, 10, 12 and 13 are not continuous but are divided into lengths appropriate to groups of spindles, the elements of the rails 9 and 10 being slightly larger than those of the rails 12 and 13 the ends of which rails 9 and 10 overlap sufficiently to enable them to be engaged by the pokers, as will be clearly seen on reference to Figures 7 and 8.

18 is a slidably movable rod arranged longitudinally of the machine in rear of the flyers 5 and carrying a series of projecting pins 19 that are adapted to be engaged with the flyers 5 to align or straighten them in the well known manner prior to the doffing operation.

20 is an angularly movable rod disposed longitudinally of the machine in rear of the spindles and carrying a series of pairs of wire prongs or fenders 21 springing from sleeves 22 rotatable with rod 20; said prongs or fenders 21 serving to hold the yarn or thread clear of the spindles and to prevent it from wrapping or coiling round them during doffing as it would otherwise tend to do.

23 is a sliding cutter bar of usual form for severing the yarns or threads and is carried by brackets 24 supported at the heads of rack pillars 25 slidable vertically in guides 26 carried by a fixed rail 27 and operated by pinions $25^a$ mounted upon a horizontal shaft $25^b$. The brackets 24 are each formed integrally with a forwardly projecting platform 28 adapted to be used to transfer a lifter rail after its removal from the spindles as explained hereafter.

The above described apparatus operates in the following manner.

Assuming that all the parts are in the "spinning" position shown in Figure 1 and that the series of bobbins F have just become filled with the correct amount of thread, the flyers 5 are first of all straightened in the well-known manner by sliding the rod 18 and engaging the pins 19 carried thereby with the flyers so as to position them in a plane parallel with the machine.

The rail 7 is then lowered by turning shaft $8^b$ and when it has reached the bottom of its travel the shaft $15^b$ is operated so as to cause rack rods 15 to move the cranked brackets 14 into such position that the pegs 17 carried by transfer rail 13 are in axial alignment below the ends of the spindles 4.

Then, by operating the usual lifter motion in the ordinary manner the pokers 11 and with them the lifter-rail 9 carrying the full bobbins F are lowered, at the same time the rod 22 is moved angularly forward so as to cause the prongs 21 to intercept the threads extending between the eyes of the flyers 5 and the full bobbins F as the latter descend with the lifter-rail 9; the threads as they uncoil from the bobbins being by this means prevented from fouling the spindles by becoming wrapped round them. The lifter motion is operated until the lifter-rail 9 with the bobbins F have passed over the pegs 17 and rest on the transfer rail 13.

The rack-rods 15 are then operated so as to move the cranked brackets 14 forwardly until the pegs 16 carrying the empty bobbins E are in axial alignment below the spindles 4, that is to say, into the position shown in Figure 3, after which, by once more actuating the lifter motion, the pokers 11 are raised and, taking under the duplicate lifter-rail 10, raise it and the empty bobbins E on to the spindles 4. At the same time the rod 20 is moved angularly backwards so as to raise the prongs 21 once more into the vertical or inoperative position.

It will be observed that during these movements the full bobbins F and empty bobbins E have remained undisturbed upon their respective drag washers $f$ and $e$.

The rack-rods 15 are now operated to move the cranked brackets 14 still further forward, into the position shown in Figure 4, and, by turning shaft 25ᵇ the rack pillars 25 carrying the sliding cutter bar 23 are elevated until said cutter bar 23 comes into contact with the threads extending between the flyer eyes and the full bobbins F. The spindles are then set in motion until a few turns of the threads have been wrapped round the empty bobbins E and the sliding cutter bar 23 is then manipulated in the usual way to sever the threads between the full and the empty bobbins. Rack pillars 25 are then lowered until the cutter bar has resumed the lowermost position of rest and the doffing being now completed spinning is recommenced.

It now remains to dispose of the full bobbins F and to position the lifter-rail 9 with the drag washers *f* thereon in readiness to receive a series of empty bobbins for use when the next doffing period arrives.

To this end, at any convenient time during the spinning operation, the full bobbins F are removed by hand from the transfer pegs 17 and when all have been collected therefrom the rack-rods 15 are manipulated until the lifter-rail 9 is positioned above the platforms 28 whereupon the rack-pillars 25 are raised until the lifter-rail 9 has been lifted clear of the tips of the pegs 16 and 17, as shown in Figure 5, upon which the rack-rods 15 are again moved to bring forward the series of pegs 16 and when these are axially below the apertures in the lifter-rail 9 the rack-pillars 25 are lowered and the platforms 28 deposit the lifter-rail 9 upon the transfer rail 12, as shown in Figure 6, after which the brackets 24 are lowered to their position of rest carrying the platforms 28 clear of the rail 12, as seen in Figure 6. A fresh series of empty bobbins is then placed by hand upon the transfer pegs or pins 16, and the apparatus is completely prepared for the next doffing operation when necessary.

Instead of being suspended from the overhead rail 2 the spindles 4 may be so arranged as to have vertical support by means of footstep bearings carried by the rail 7, the upper ends of the spindles receiving lateral support from the rail 2 and means being provided to hold and retain the spindles vertically when the rail 7 is lowered during doffing. One simple arrangement by which the spindles 4 can be thus temporarily supported is to fit on or form each spindle with an annular collar and to attach to the overhead rail 2 adjacent to the upper end of each spindle a suitably shaped stop or bracket on to which said annular collar would be brought when the vertical support of the spindle rail 7 is removed from the lower ends of the spindles. During spinning these annular collars would be just out of contact with their respective stops or brackets and would come to rest thereon as the result of slight downward movement of the spindles on the withdrawal of the spindle rail. No variations or alterations are necessitated in the construction or functioning of the actual doffing mechanism under such circumstances.

What we claim is:

1. In spinning, twisting and analogous machines of the kind specified, spindles, two separate lifter-rails apertured to pass onto and from said spindles, each lifter-rail supporting directly a series of bobbins, traversing devices for receiving one of said lifter-rails, each lifter-rail fitting exchangeably upon said traversing devices, two transfer rails in conjunction with which said lifter-rails are manipulated alternately, said transfer rails having pegs thereon spaced coincidently with said spindles over which pegs said apertured lifter-rails are adapted to be passed, and means for manipulating said lifter-rails and said transfer rails into and out of operative position for the purpose of doffing said bobbins.

2. In spinning, twisting and analogous machines of the kind specified, "live" spindles, duplicate apertured lifter-rails each adapted to support a series of bobbins and to be manipulated alternately on to and from said "live" spindles in conjunction with two transfer rails carrying transfer pegs adapted to be positioned co-axially with said "live" spindles and over which transfer pegs said lifter-rails are fitted, and means for manipulating said lifter-rails and said transfer rails.

3. In spinning, twisting and analogous machines of the kind specified, "live" spindles, duplicate apertured lifter-rails each adapted to support a series of bobbins and each apertured at intervals corresponding with the spacing of said "live" spindles, two transfer rails each having transfer pegs also spaced at intervals corresponding with said spacing of said "live" spindles, and means for manipulating said apertured lifter-rails in conjunction with said transfer rails in order to effect an exchange of bobbins on said live spindles.

4. In spinning, twisting and analogous machines of the kind specified, "live" spindles, duplicate apertured lifter-rails each adapted to support a series of bobbins and each apertured at intervals corresponding with the spacing of said "live" spindles, two transfer rails each having transfer pegs also spaced at intervals corresponding with said spacing of said "live" spindles, said transfer pegs being adapted to be positioned co-axially with said "live" spindles to place bobbins thereon and to receive bobbins therefrom and said apertured lifter-rails fitting over said transfer pegs on said transfer rails, and means for manipulating said apertured lifter-rails in conjunction with said transfer rails in order to effect an exchange of bobbins on said live spindles.

5. In spinning, twisting and analogous machines of the kind specified, two separate apertures lifter-rails each adapted to support a series of bobbins and whereof one remains inactive while the other is functioning to build up the bobbins during the spinning operation, said lifter-rails being adapted to exchange positions periodically, two transfer rails having transfer pegs over which said lifter-rails are fitted, and means for manipulating said lifter-rails in conjunction with said transfer rails in order to effect an exchange of bobbins.

6. In spinning, twisting and analogous machines of the kind specified, live spindles, duplicate lifter-rails apertured to pass onto and from said live spindles, each lifter-rail supporting directly a series of bobbins and serving directly to traverse same relatively to said live spindles, traversing devices for receiving one of said lifter-rails, each lifter-rail fitting exchangeably upon said traversing devices, means to actuate said traversing devices, two transfer rails in conjunction with which said lifter-rails are manipulated alternately, said transfer rails having pegs thereon spaced coincidently with said live spindles over which pegs said duplicate apertured lifter-rails are adapted to be passed, adjustable means for supporting said apertured lifter rails and said transfer rails during their respective positional movements, and means for manipulating said adjustable supporting means.

7. In spinning, twisting and analogous machines of the kind having live spindles, doffing mechanism comprising two separate exchangeable lifter-rails apertured to pass onto and from said live spindles, each lifter-rail being adapted to support a series of bobbins, devices to receive directly and traverse either of said lifter-rails to build up said bobbins during the spinning operation, two transfer peg rails adapted to support said apertured lifter-rails during their exchange, the pegs on said peg rails being spaced coincidently with said live spindles, and means for manipulating either of said apertured lifter-rails and its appropriate bobbins onto and from said live spindles.

8. In spinning, twisting and analogous machines of the kind having live spindles, doffing mechanism comprising two separate exchangeable lifter-rails apertured to pass onto and from said live spindles, each lifter-rail being adapted to support a series of bobbins, devices to receive directly and traverse either of said lifter-rails to build up said bobbins during the spinning operation, two transfer peg rails adapted to support said apertured lifter-rails during their exchange, the pegs on said peg rails being spaced coincidently with said live spindles, means for preventing said live spindles from becoming fouled by thread, means for manipulating either of said apertured lifter-rails and its appropriate bobbins onto and from said lifter-rail receiving and traversing devices, and means to actuate said receiving and traversing devices.

9. In spinning, twisting and analogous machines of the kind having live spindles, two separate lifter-rails apertured to pass onto and from said spindles, each lifter-rail supporting directly a series of bobbins and each lifter-rail being constructed of a plurality of sections in alinement, traversing devices for said lifter-rails which fit thereonto exchangeably, two transfer peg rails over the pegs on which said apertured lifter-rails are fitted, said pegs on said transfer peg rails being spaced coincidently with said spindles and said transfer peg rails also being constructed of a plurality of sections in alinement, brackets supporting said transfer peg rails, means for preventing said live spindles from becoming fouled by thread, and means for traveling said brackets to carry either of said apertured lifter-rails and its appropriate bobbins directly onto and from said lifter-rail traversing devices.

10. Doffing mechanism for spinning, twisting and analogous machines having live spindles, comprising duplicate apertured lifter-rails whereof either one fits on to one of two transfer peg rails while the other is functioning to build up the bobbins during the spinning operation and is exchangeable therewith during doffing, adjustable brackets carrying said transfer peg rails and capable of movement to position the pegs thereon axially of said live spindles, adjustable platforms to receive one of said apertured lifter-rails during the exchange and to replace it on one of said transfer peg rails in readiness to receive a fresh supply of bobbins, adjustable prongs to prevent coiling of thread around said spindles during doffing, and rack-and-pinion operated devices to manipulate said apertured lifter-rails into and out of the operative spinning position.

In testimony whereof we affix our signatures.

WILLIAM PRINCE-SMITH.
DAVID WATERHOUSE.